United States Patent [19]

Joo' et al.

[11] 4,144,383

[45] Mar. 13, 1979

[54] POSITIVE ELECTRODE FOR LITHIUM/METAL SULFIDE SECONDARY CELL

[75] Inventors: Louis A. Joo'; Frederick C. Miller, both of Johnson City, Tenn.

[73] Assignee: Great Lakes Carbon Corporation, New York, N.Y.

[21] Appl. No.: 838,755

[22] Filed: Oct. 3, 1977

[51] Int. Cl.$^2$ ............................................. H01M 4/04
[52] U.S. Cl. ................................... 429/218; 429/220; 429/221; 429/223; 429/236; 252/506; 252/182.1
[58] Field of Search ............................. 252/506, 182.1; 429/236, 221, 218, 220, 223

[56] References Cited

U.S. PATENT DOCUMENTS

| 2,627,531 | 2/1953 | Vogt | 429/221 |
| 3,933,520 | 1/1976 | Gay et al. | 429/221 X |
| 3,947,291 | 3/1976 | Yao et al. | 429/221 X |
| 4,011,373 | 3/1977 | Kaun et al. | 429/221 X |
| 4,011,374 | 3/1977 | Kaun | 252/182.1 X |

Primary Examiner—Richard E. Schafer
Assistant Examiner—E. Suzanne Parr
Attorney, Agent, or Firm—Adrian J. Good

[57] ABSTRACT

A rechargeable electrical energy storage device including a lithium-containing negative electrode, a lithium ion electrolyte, and a positive electrode containing iron sulfide formed in situ by the reaction of a predeposited solid iron salt and hydrogen sulfide within a porous carbon structural body.

13 Claims, No Drawings

POSITIVE ELECTRODE FOR LITHIUM/METAL SULFIDE SECONDARY CELL

BACKGROUND OF THE INVENTION

1. Field of the Invention

The invention relates to lithium/metal sulfide energy storage batteries and particularly to novel positive electrodes for such batteries.

2. Description of the Prior Art

Development of energy storage batteries for load-leveling in electrical utilities during periods of peak power demand and as power sources for electric vehicles has been emphasized in recent years due to the increasing requirement for compact, pollution-free electrical power sources.

A major result of this effort has been the production of the lithium/sulfur battery, which generally comprises a lithium negative electrode, a molten salt electrolyte, and a positive electrode comprising sulfur and a current collector material. During discharge of such a battery, lithium is oxidized to lithium ions at the negative electrode by the reaction $Li \rightarrow Li^+ + e^-$, which migrate through the electrolyte and react with the sulfur electrode to form lithium sulfide ($Li_2S$) by the reaction $2Li^+ + S + 2e^- \rightarrow Li_2S$. The electrical energy generated by this reaction is removed from the battery through terminals provided therein. The battery may be recharged by supplying current thereto from an external source in a reverse direction, causing the lithium ions to migrate back to the negative electrode, where metallic lithium is formed by electron addition.

During the development of these batteries, it was found that sulfur used alone in the positive electrode tended to escape from the electrode both through vaporization and through the solubility of certain sulfur-bearing species in the molten salt electrolyte. Although these effects can be suppressed by additives such as arsenic or selenium, which lower the activity of the sulfur, it is questionable whether they are sufficiently effective to permit long battery lifetimes.

One of the most significant developments relating to lithium/sulfide power sources has been the discovery that selected metal sulfides are highly efficient as active materials in the positive electrodes of lithium/sulfur batteries. Metal sulfides were considered as alternatives to sulfur on the premise that the activity of sulfur in these compounds would be low enough to eliminate sulfur losses by vaporization or solubility, but not so low as to unduly decrease the battery voltage. ("Development of High-Specific-Energy Batteries for Electric Vehicles, "Progress Report for the Period August 1973–January 1974, Argonne National Laboratory, ANL-8058). From a practical standpoint, the metal sulfides of iron, cobalt, nickel, copper and mixtures thereof have the desirable characteristics of low cost, abundance, and lack of toxicity.

SUMMARY OF THE INVENTION

It is an object of this invention to provide an improved lithium-iron sulfide secondary cell having improved cycle life and lower cost of manufacture than those presently in use.

A lithium negative electrode, an electrolyte containing lithium ions, and an iron sulfide positive electrode are provided. Alternately a lithium alloy which is solid at the operating temperature, a eutectic mixture of lithium and other alkali metal halides may be used as the electrolyte, and other transition metal chalcogenides may be used as the positive electrode. The active cathodic material is supported by a matrix of a conductive solid which is usually a preformed carbon or graphite foam or fibrous lattice, a metallic mesh, or by an in situ formed carbon or graphite matrix. The transition metals used are preferably iron, copper, cobalt or nickel, although others which have incomplete outer electron shells may also be used such as zinc, chromium, molybdenum, and vanadium. The chalcogenides generally useful include sulfur, oxygen, selenium, and tellurium.

To provide a rechargeable cell with a high current density and low internal resistance, it is necessary when using a solid cathodic material, such as iron sulfide, that all particles be in intimate contact with an electrically conductive current collector and that there be the maximum of interfacial surface contact area. One method is obviously to use a quantity of a conductive filler in an intimate mixture with the iron sulfide, both of which are in the form of finely divided powders. Other methods include impregnation of various matrices with the electrode material by hot melt or electrochemical deposition from a solution.

The present invention assures the maximum interfacial contact of the iron sulfide and the matrix by impregnating the matrix with a solution of an iron salt at the required concentration to deposit the preferred amount of iron salt within the matrix, evaporating the solution to dryness, whereupon the iron salt is deposited upon the structure of the matrix, then treating the structure thus formed with gaseous $H_2S$ to form iron sulfide in situ. The overall reaction thus is:

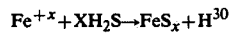
$$Fe^{+x} + XH_2S \rightarrow FeS_x + H^{30}$$

The use of this method will insure that the positive electrode formed in this manner will have the iron sulfide intimately in contact with the supporting matrix, with the maximum obtainable interfacial surface area.

The amount of iron salt deposited is controlled in order to obtain the optimum level of deposition at which the maximum current density available is balanced against the need to allow for volumetric expansion on cycling of the cell, during the reaction,

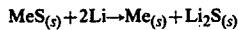
$$MeS_{(s)} + 2Li \rightarrow Me_{(s)} + Li_2S_{(s)}$$

which will have a volumetric expansion to about 180% of the original volume if FeS is used, and to 258% if $FeS_2$ is used.

DESCRIPTION OF THE PREFERRED EMBODIMENT

Although in general almost any of the transition metal chalcogenides may be used as the cathodic material in this cell, the sulfides of iron or mixtures with other transition metal sulfides are preferred, as having high theoretical energy density at low cost.

According to the invention, a carbon or graphite foam or felt of void volume of about 90% preferred, although the void volume may vary from 70–97%, with concomitant volume solids of 3–30%, placed in a shaped container of the proper dimensions, is wetted with sufficient $FeCl_3$ in solution to provide the desired final loading of $Fe_2S_3$. This impregnated material is then heated to evaporate the solvent and deposit the dry $FeCl_3$ salt upon the matrix in the form of a layer of crystals upon each fiber or cell wall of the matrix. Gaseous $H_2S$ is then introduced and allowed to react until the entire amount of the $FeCl_3$ has been converted to $Fe_2S_3$.

An example of the foregoing consists of a 100 cc cavity filled with a solid carbonaceous foam with a void volume of about 90 cc, wetted with a solution of 100g $FeCl_3$ in 50 ml $H_2O$ at 100° C. The foam is heated to about 100° C. to evaporate the water and thus deposit the salt on the substrate. The shaped, treated electrode is removed from the form, placed in a gas tight pressure cell, and reacted with $H_2S$ for sufficient time to complete the reaction with $FeCl_3$ to $Fe_2S_3$. The total process may be carried out in the cell container which typically is a rigid formed graphite shape, or in a mold. The resulting electrode is a matrix with approximately 17% of its void volume occupied by $Fe_2S_3$, the preferred volume, although the occupied volume may vary from 10–40% leaving ample room for the physical expansion during the reduction to free iron and $Li_2S$ in the half-cell reaction. The resulting cell thus may have from 3–30% by volume carbon or graphite, 10–40% by volume of metal chalcogenide, from 45–85% by volume of molten salt electrolyte, with the exact volume of the reactive components at any one time dependent on the initial combination and the state of charge of the cell.

A further example is shown by the production of a saturated solution of 100g of $FeCl_3$ dissolved in $H_2O$, to form a saturated solution, or dissolved in a smaller amount of $H_2O$ forming a supersaturated solution at a temperature of approximately 100° C., wetting a graphite or carbon matrix of an open-celled foam or felt with a bulk volume of 100 cc and a void volume of 90 cc, with this solution, whereupon the solution is simultaneously cooled and the salt deposited upon the matrix, drying the matrix for 24 hours at 100° C., then reacting with $H_2S$ at 5 psi (0.4 kg/cm$^2$) above atmospheric, the preferred value in the range of 1-10 PSI (0.07-0.7 kg/cm$^2$) for 24 hours.

A further example is shown by taking the previously shown 100 cc foam, wetting it with a saturated or supersaturated solution in $H_2O$ of $FeCl_2$ at room temperature, draining off the excess, drying at 100° C., reacting with $H_2S$, and repeating the cycle for the number of times necessary to form a deposit of the desired quantity of FeS upon the matrix.

We claim:

1. A method for making an improved positive electrode for use in a high temperature secondary cell consisting of a matrix of electrically conductive carbon or graphite in intimate interfacial contact with a molten salt electrolyte of alkali metal halides and a transition metal sulfide selected from the group consisting of the sulfides of iron, copper, cobalt and nickel, or a mixture of said sulfides, the improvement wherein said metal sulfide or mixture thereof is formed in situ by deposition from a solution of a soluble salt or salts of the metal or metals, subsequently evaporating the solvent to deposit the salt or salts in intimate interfacial contact with the matrix, said metal sulfide or mixture thereof then being formed by the reaction of the metal salt or salts with gaseous hydrogen sulfide.

2. The method of claim 1 wherein the soluble metal salt is ferric chloride.

3. The method of claim 1 wherein the soluble metal salt is ferrous chloride.

4. The method of claim 1 wherein the hydrogen sulfide is introduced at a pressure above atmospheric.

5. The method of claim 1 wherein the hydrogen sulfide is introduced at a pressure of from 1-10 psi (0.07-0.7 kg/cm$^2$).

6. The method of claim 1 wherein the matrix is a felt of graphite fibers.

7. The method of claim 1 wherein the matrix is a preformed carbonaceous or graphitic foam.

8. The method of claim 1 wherein the electrode structure is a carbon or graphite foam or felt with from 70-97% void volume.

9. The method of claim 1 wherein the electrode has from 10-40% by volume of the sulfide or a mixture selected from the group consisting of the sulfides of iron, copper, cobalt, and nickel.

10. The method of claim 1 wherein the matrix is formed from a mixture of chopped graphite fibers, premixed with a solution of a salt or mixture of salts of said metals.

11. The method of claim 1 wherein the solution of metal salt or salts is a hot supersaturated solution in water of said salt or salts.

12. The method of claim 1 wherein the solution of metal salt or salts is a hot saturated solution in water of said salt or salts.

13. A positive electrode for a secondary electrochemical cell formed by the process of impregnating a conductive matrix with a solution in water of transition metal salt or salts, drying said solution by evaporation of the solvent to form a salt deposit upon said matrix, and converting said salt deposit to metal sulfide by the action of gaseous hydrogen sulfide.

* * * * *